United States Patent [19]

Zorbalas

[11] 4,335,401

[45] Jun. 15, 1982

[54] RAPID CORRELATION OF RECORDED INFORMATION

[75] Inventor: George S. Zorbalas, Cherry Hill, N.J.

[73] Assignee: RCA Corporation, New York, N.Y.

[21] Appl. No.: 181,998

[22] Filed: Aug. 28, 1980

[51] Int. Cl.³ ............................................. G11B 15/46
[52] U.S. Cl. ..................................... 358/127; 360/73; 360/14
[58] Field of Search ............................ 360/73, 70, 14; 318/314; 358/127

[56] References Cited

U.S. PATENT DOCUMENTS

| | | | |
|---|---|---|---|
| 3,638,089 | 1/1972 | Gabor | 360/73 |
| 3,643,012 | 2/1972 | Clark | 360/70 |
| 3,651,276 | 3/1972 | Clark | 360/70 |
| 4,163,263 | 7/1979 | Rotter | 360/36 |

Primary Examiner—Bernard Konick
Assistant Examiner—Alan Faber
Attorney, Agent, or Firm—Eugene M. Whitacre; Paul J. Rasmussen; William H. Meise

[57] ABSTRACT

A recorded medium is brought to its operational velocity at which a phase lock is simultaneously achieved between a recorded sync signal thereon and an external reference sync signal, during a rapid framing cycle that corresponds in time with the duration taken by the recorded medium to travel through a distance equal to two consecutive spaces between recorded sync signal pulses.

5 Claims, 2 Drawing Figures

RAPID CORRELATION OF RECORDED INFORMATION

BACKGROUND OF THE INVENTION

The present invention relates generally to the correlation of recorded information and more particularly to what is known as framing in video recorders. When information is recorded on a medium, a sync signal is often disposed thereon at a frequency to identify discrete segments of the information. Then by phase locking the sync signals on separate recorded mediums with an external or reference sync signal of the same frequency, the segments of information on the separate recorded mediums are correlated. One application of such information correlation is found in video recording where a discrete segment of information is a field or frame and where recorded information on separate mediums must be correlated or framed for various purposes, such as editing. Many of these purposes, especially editing, require that each separate recorded medium be stopped intermittently and framed again or brought back up to its operational velocity with its recorded sync signal phase locked to the reference sync signal.

Different prior art techniques exist for accomplishing this framing, but most of these techniques are slow because they are limited by the relatively low common frequency of the recorded and reference sync signals, which is usually the same frequency as the frame sync signal or 30 Hz for NTSC systems. Because these prior art techniques are slow, numerous uncorrelated frames or fields are replayed while framing is accomplished. A U.S. patent application Ser. No. 173,629 was filed on July 30, 1980 by R. A. Dischert and J. M. Walter in which a fast framing technique is disclosed and the assignee of that application is also the assignee of the present application. In the Dischert and Walter disclosure, recorded information is framed by accelerating the recorded medium from an intermediate velocity to its operational velocity in distinct intervals between which a constant velocity interval is maintained to phase lock the recorded and reference sync signals when the operational velocity is reached. However, this application fixes the separate durations of acceleration and constant velocity in proportion to the intermediate velocity being utilized.

SUMMARY OF THE INVENTION

During a rapid framing cycle, a recorded medium is brought to its operational velocity at which a phase lock is simultaneously achieved between a recorded sync signal thereon and an external reference sync signal. Acceleration of the recorded medium from an intermediate velocity to its operational velocity is accomplished in distinct intervals between which a constant velocity interval is maintained to phase lock the recorded sync signal and the reference sync signal when the operational velocity is reached. Rapid framing is accomplished by limiting the cumulative duration of the acceleration and constant velocity intervals to the time required for the recorded medium to travel a distance during the framing cycle equal to two consecutive spacings between recorded sync signal pulses. In a particular embodiment, the durations of the distinct acceleration intervals are fixed in accordance with a factor derived from the phase difference between the recorded and reference sync signals at the start of the framing cycle.

DESCRIPTION OF THE PREFERRED EMBODIMENT

Figure 1:
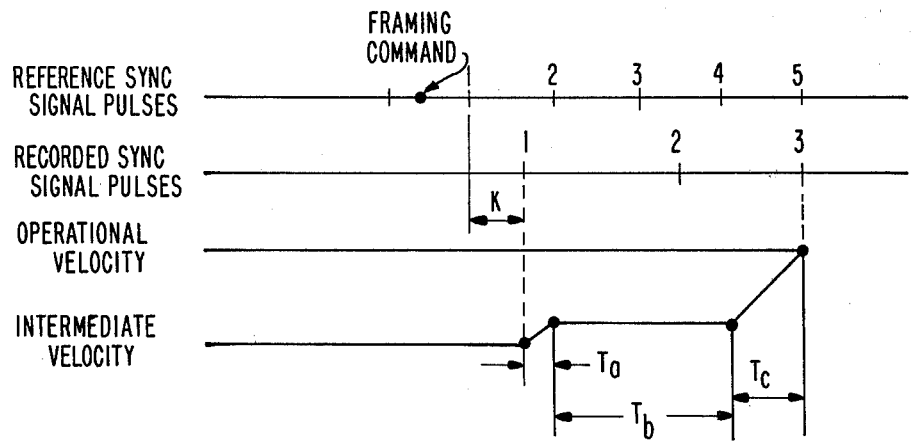
FIG. 1 illustrates the velocity profile utilized by the invention to bring a recorded medium to its operational velocity while simultaneously phase locking recorded sync signal pulses thereon to reference sync signal pulses.

The rapid framing cycle of this invention utilizes a velocity profile having the general configuration shown with solid lines in FIG. 1. In this velocity profile, the recorded medium is accelerated from an intermediate velocity to its operational velocity in distinct intervals $T_a$ and $T_c$. Between these distinct intervals of acceleration, the recorded medium is maintained at a constant velocity for an interval $T_b$ during which a slippage occurs between the recorded and reference sync signals to attain phase locking therebetween. After a framing command is given, the first acceleration interval in the framing cycle is started by the occurrence of the first recorded sync signal pulse when the recorded medium is travelling at the intermediate velocity. The duration of acceleration ($T_a$ and $T_c$) and the duration of constant velocity ($T_b$) are each controlled to correspond with the time required for the recorded medium to travel a distance equal to the space between consecutive recorded sync signal pulses. The separate durations of the distinct acceleration intervals $T_a$ and $T_c$ are controlled in accordance with a factor K derived from the phase difference between the recorded and reference sync signals at the start of the framing cycle. Consequently, the magnitude of the acceleration during the framing cycle depends on the selected intermediate velocity, whereas the durations of intervals $T_a$ and $T_c$ depend on the phasing factor K when the framing cycle is started.

Of course, the framing command may be given at any time between successive reference sync signal pulses and it actually initiates a preliminary cycle during which the phasing factor K is derived. Furthermore, the recorded medium could be accelerated or decelerated to the intermediate velocity during this preliminary cycle, which would require a finite time depending on the nature of the mechanism that is utilized to transport the recorded medium. Regardless of the nature of the preliminary cycle however, the transport mechanism must be given sufficient time to stabilize the recorded medium at the intermediate velocity before the phasing factor K is derived. Because the difference between the operational velocity and the velocity maintained during the constant velocity interval determines the amount of slip derived between the recorded and reference sync signals, the duration of the first acceleration interval $T_a$ will determine the extent of that slip. If the phase difference between the recorded and reference pulses is great therefore, $T_a$ is long and a short slippage is accomplished; whereas if that phase difference is small, $T_a$ is short and a large slippage is accomplished. Consequently, the velocity profile for the framing cycle of the invention will have a configuration that is dependent on both the phasing factor and the magnitude of the intermediate velocity.

Mathematically, it can be shown that the magnitude of the intermediate velocity for which the preliminary and framing cycles will both be completed in the optimum time, is equal to one-third the operational velocity. The duration of the acceleration interval $T_a$ when the intermediate velocity equals one-third the operational velocity is derived in accordance with the following equation:

$$T_a = (3/2)T((1+2K)/(10-4K))$$

wherein T is the period of the reference sync signal or the recorded sync signal when the recorded medium is moving at the operational velocity and K is the phasing factor.

Figure 2:
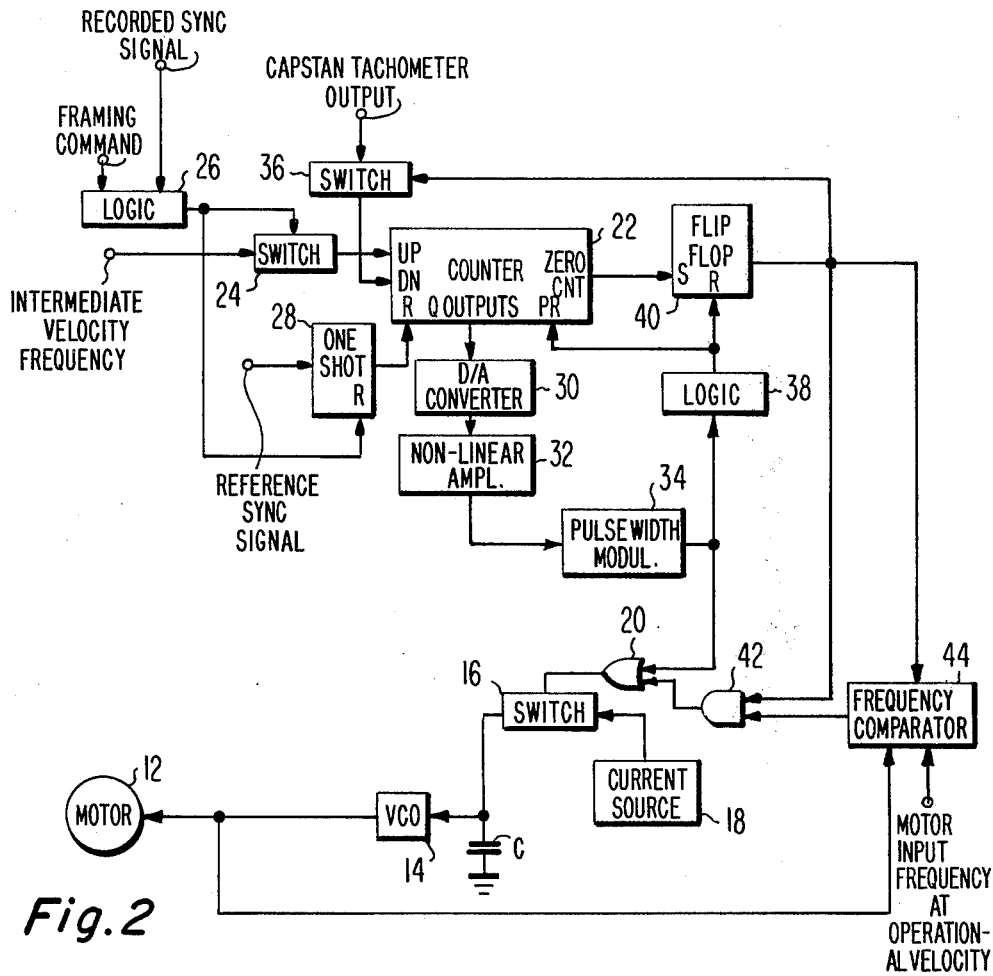
FIG. 2 is a block diagram of a control means for deriving the velocity profile of FIG. 1.

A block diagram for one embodiment of a control means for deriving the acceleration and constant velocity intervals in the framing cycle of this invention is illustrated in FIG. 2. Movement of the recorded medium can only be controlled through its transport mechanism which may be structured in any conventional manner within the scope of this invention. A frequency controlled DC motor 12 is included in FIG. 2 because that type of motor is found in the capstan drive transport mechanisms of present day tape record and replay systems. In these transport mechanisms, the capstan includes a tachometer (not shown) which generates a fixed number of pulses during each revolution of the capstan and the travel parameters of the tape such as length or velocity, are derived by counting these pulses.

The speed of motor 12 is directly proportional to the frequency of its input signal which is derived from a voltage controlled oscillator (VCO) 14 having an output frequency that is proportional to its input voltage level. During the framing cycle, the input to the VCO 14 is the voltage level across a capacitor C which is charged through a switch 16 by a current source 18. Since the motor 12 drives the transport mechanism of the recorded medium, the magnitude of the current source 18 determines the rate of acceleration during the intervals $T_a$ and $T_c$ in the velocity profile of FIG. 1. Output from an OR gate 20 controls the switch 16 with current being applied therethrough when that output is high.

To derive the phasing factor K, a frequency proportional to the intermediate velocity is applied at the upcount input of an up/down counter 22 through a switch 24. Logic 26 controls switch 24 to render it nonconductive upon the occurrence of the first recorded sync signal pulse after the framing command is given. Output from a one-shot multivibrator 28 is applied at the reset input of counter 22 to set the count thereof to zero. The reference sync signal is applied to trigger the one-shot 28 which is reset by the output of logic 26. Therefore, the upcount occurs before the start of the framing cycle and it is a measure of the time by which the recorded sync signal lags the reference sync signal with the recorded medium moving at the intermediate velocity. This upcount is applied to a digital to analog converter 30 from which the phasing factor K is derived as an output.

At the start of the framing cycle, the phasing factor K is applied to a non-linear amplifier 32 which is structured to derive an analog voltage in proportion to the duration of $T_a$ for a particular intermediate velocity, such as in accordance with the above-stated equation. Output from amplifier 32 is applied to one input of OR gate 20 through a pulse width modulator 34 and consequently, current from source 18 is applied to capacitor C through switch 16 for the duration of a pulse from modulator 34 having a width equal to $T_a$. Of course, the output frequency of VCO 14 increases proportionally as the voltage across capacitor C is increased throughout the $T_a$ interval and the motor 12 accelerates the recorded medium.

Upon completion of the $T_a$ interval, the width modulated pulse from modulator 34 ends and OR gate 20 renders switch 16 non-conductive to interrupt the current flow from source 18 to capacitor C and the $T_b$ interval is then initiated. Because the duration of the $T_b$ interval corresponds with the time required for the recorded medium to travel a distance equal to the space between consecutive recorded sync signal pulses, the fixed number of capstan tachometer pulses encountered between consecutive recorded sync signal pulses is preset as the downcount of the counter 22. Output from the capstan tachometer is applied at the downcount input of counter 22 through a switch 36. Logic 38 for detecting the trailing edge of the width modulated pulse from modulator 34 initiates the downcounting mode of counter 22. When that trailing edge occurs, logic 38 applies a pulse to both the preset input of the counter 22 and the reset input of a flip-flop 40. Switch 36 is controlled by the output of flip-flop 40 and becomes conductive when that output is low. Counter 22 then counts down to zero. The zero count output of counter 22 is applied to set flip-flop 40, with the high output resulting therefrom being applied to one input of an AND gate 42 and to enable a frequency comparator 44 having its output applied to the other input of AND gate 42. Output from VCO 14 and a reference frequency corresponding to the input frequency of the motor 12 when the recorded medium is moving at its operational velocity, are applied to the inputs of comparator 44 which produces a high output until the frequency of the VCO 14 reaches that of the reference frequency.

During the $T_b$ interval, switch 16 is nonconductive and the voltage across capacitor C remains constant, so that the VCO 14 drives the motor 12 with a constant frequency input to maintain the velocity of the recorded medium constant. The downcount of counter 22 determines the duration of the $T_b$ interval which is terminated when the output of flip-flop 40 goes high to enable OR gate 20 through AND gate 42. Switch 16 then becomes conductive again to initiate the $T_c$ interval during which current from the source 18 is applied to the capacitor C. Since the $T_c$ interval must be terminated when the recorded medium reaches its operational velocity, AND gate 42 is disabled by the output change of frequency comparator 44 to a low level which renders switch 15 nonconductive through OR gate 20.

What I claim is:

1. In a replay system of the type wherein a recorded medium having a sync signal recorded thereon to identify discrete segments of information is accelerated to its operational velocity from an intermediate velocity during a framing cycle in which the acceleration is accomplished in distinct intervals between which a constant velocity interval is maintained to phase lock the recorded sync signal with an external reference sync signal when the operational velocity is reached, the improvement comprising:

control means for establishing the total duration of the accleration and constant velocity intervals to correspond with the time taken by the recorded medium to travel through a distance equal to two consecutive spaces between recorded sync signal pulses.

2. The replay system of claim 1 wherein the intermediate velocity of the recorded medium is equal to one-third the operational velocity thereof.

3. The replay system of claim 1 wherein the constant velocity interval is performed while the recorded medium moves through a distance equal to the spacing between consecutive recorded sync signal pulses and the duration of the initial acceleration interval is derived in accordance with a factor relating to the phase between the recorded and reference sync signals when the recorded medium is moving at the intermediate velocity.

4. In a replay system of the type wherein a recorded tape having a sync signal recorded thereon to identify discrete segments of information is accelerated to its operational velocity from an intermediate velocity during a framing cycle in which the acceleration is accomplished in distinct intervals between which a constant velocity interval is maintained to phase lock the recorded sync signal with an external reference sync signal when the operational velocity is reached, the improvement comprising:

control means for establishing the total duration of the acceleration and constant velocity intervals to correspond with the time taken by the recorded tape to travel through a distance equal to two consecutive spaces between recorded sync signal pulses, and for establishing the duration of the constant velocity interval to correspond with the time taken by the recorded tape to travel through a distance equal to the spacing between consecutive recorded sync signal pulses and to derive the duration of the initial acceleration interval in accordance with a factor relating to the phase between the recorded and reference sync signals when the recorded tape is travelling at the intermediate velocity; and a capstan drive transport mechanism is included to pull the tape, said transport mechanism being driven by a motor of the type in which speed is proportional to the frequency of its input and having the output of a voltage controlled oscillator applied at the input to said motor, said voltage controlled oscillator having the voltage level across a capacitor applied to its input throughout the framing cycle, said voltage level being changed by a current source which is applied through a switch to said capacitor, said switch being controlled to determine the durations of the acceleration and constant velocity intervals.

5. The replay system of claim 4 wherein said switch is conductive throughout the acceleration intervals and nonconductive throughout the constant voltage interval, said switch being rendered conductive throughout the initial acceleration interval by a pulse of controlled width as derived through a nonlinear amplifier in accordance with said phasing factor, said phasing factor being derived by counting at a frequency rate in proportion to the intermediate velocity from the first occurring reference sync signal pulse after the intermediate velocity has been reached subsequent to a framing command being given to when the first recorded sync signal occurs thereafter, said switch being rendered nonconductive by the trailing edge of said pulse to start the constant velocity interval which is terminated after counting down through the number of capstan tachometer pulses equal to the distance between consecutive recorded sync signal pulses, said switch being rendered conductive by the termination of the constant velocity interval to start the final acceleration interval which is terminated when the output frequency of said voltage controlled oscillator reaches the required input frequency of said motor at the operational velocity of the tape.

* * * * *